2 Sheets—Sheet 1.

F. RHIND.

Assignor of one-half to E. MILLER & COMPANY.

EXTENSION LAMP FIXTURE.

No. 10,967. Reissued Nov. 20, 1888.

Witnesses.
Ira R. Steward.
William P. Egan

Inventor.
Frank Rhind.
By his Attorney W. W. Canfield.

N. PETERS, Photo-Lithographer, Washington, D. C.

F. RHIND.

Assignor of one-half to E. MILLER & COMPANY.

EXTENSION LAMP FIXTURE.

No. 10,967. Reissued Nov. 20, 1888.

Witnesses.
Ira R. Steward.
William P. Egan.

Inventor.
Frank Rhind.
By his Attorney W. W. Canfield.

N. PETERS, Photo-Lithographer, Washington, D. C.

UNITED STATES PATENT OFFICE.

FRANK RHIND, OF MERIDEN, CONNECTICUT, ASSIGNOR OF ONE-HALF TO EDWARD MILLER & COMPANY, OF SAME PLACE.

EXTENSION LAMP-FIXTURE.

SPECIFICATION forming part of Reissued Letters Patent No. 10,967, dated November 20, 1888.

Original No. 383,769, dated May 29, 1888. Application for reissue filed July 23, 1888. Serial No. 280,846.

*To all whom it may concern:*

Be it known that I, FRANK RHIND, of Meriden, in the county of New Haven and State of Connecticut, have invented a new Improvement in Extension Lamp-Fixtures; and I do hereby declare the following, when taken in connection with accompanying drawings and the letters of reference marked thereon, to be a full, clear, and exact description of the same, and which said drawings constitute part of this specification, and represent, in—

Figure 1:
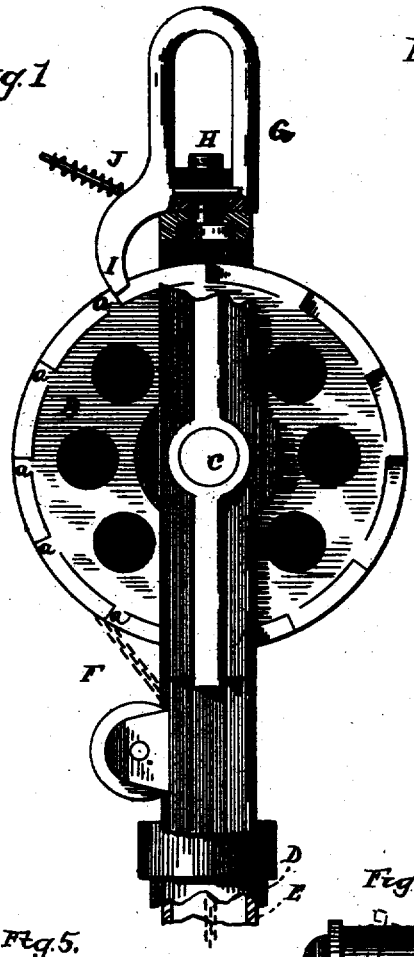
Figure 2:
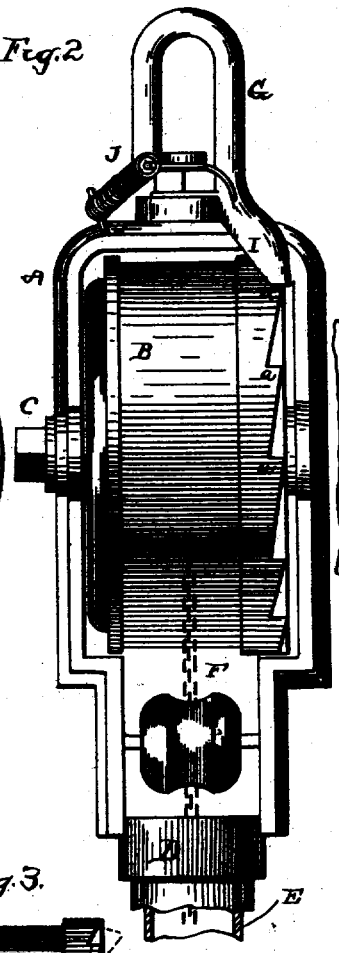
Figure 4:
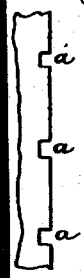
Figure 5:
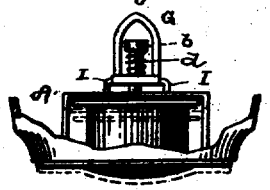
Figure 3:
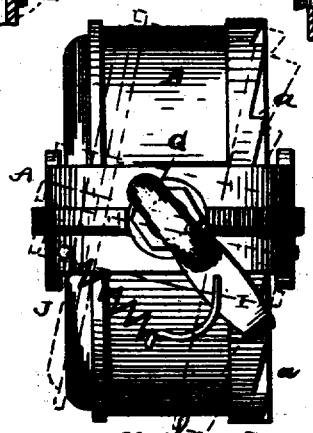
Figure 6:
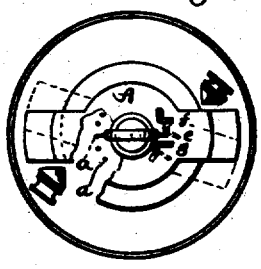

Figure 1, a side view of the frame and upper portion of the central shaft of a chandelier, but in partial section, illustrating the invention with the drum arranged upon a horizontal axis; Fig. 2, a side view turned one-fourth around from the position seen in Fig. 1; Fig. 3, a top or plan view of the same; Fig. 4, a modification in the construction of the notches in the drum; Figs. 5 and 6, respectively, side and top views of the frame, drum, and hanger in partial section, illustrating the application of the invention to a drum arranged upon a vertical axis; Figs. 7, 8, 9, and 10, modifications.

This invention relates to an improvement in that class of illuminating fixtures which are designed to carry lamps, and which are suspended from the ceiling of the apartment with contrivances to permit the lamp or lamps to be drawn down from the ceiling or adjusted to different elevations.

In some cases the fixture carries but a single lamp suspended by two or more chains. In other cases it is in the form of a chandelier, in which the central shaft is of a telescopic character, one part hung in positive engagement with the ceiling, so as to remain stationary as to elevation, and the other part carrying the lamps or burners, movable up and down. The two parts of the shaft are usually tubular, and the tubes serve as a guide for the up-and-down adjusting movement. These classes of fixtures are usually provided with a spring-drum supported in a frame, through which the fixture is hung to the ceiling. The drum carries one or more cords or chains, which run therefrom down into connection with the adjustable part of the fixture, and so that as the adjustable part is pulled downward it will draw the cord or chains from the spring-drum and accordingly rewind the spring within the drum, so that the reaction of the spring when free will raise the adjustable part or aid in so doing. In these classes of fixtures the weight of the adjustable portion is variable to a considerable extent. This variation arises, first, from the consumption of the oil in the founts. The lamps of the present day being rapid consumers, the founts are required to be large and the consumption of the oil rapidly reduces the weight. Again, the founts are variable in their weight. The shades which are often applied to the lamps are not only variable in their weight, but their presence or absence creates a great variation in the weight of the adjustable part. Again, founts are usually removed for trimming. To remove the fount, the adjustable part is necessarily pulled downward to a considerable extent. Then the removal of the fount greatly reduces the weight of the adjustable part. If the spring is adjusted so as to support the adjustable part in its elevated position—a position where the fount must be permitted to stand—the drawing down of the adjustable part increases the lifting power of the spring, so that the tendency to lift the adjustable part of the fixture increases as the said adjustable part is drawn downward. It therefore follows that if the spring has a power to support the adjustable part in its elevated position, if no provision to the contrary be made, the increasing power of the spring as the adjustable part is pulled downward will give to it a strength to raise the adjustable part, so that it could not stand at the lower elevation, but would necessarily rise under the power of the spring.

Frictional devices have been applied sometimes between the adjustable and stationary parts, and at other times upon the spring-drum, which offer a sufficient resistance to the action of the spring to prevent its moving the adjustable part, and so that the adjustable part may stand at any elevation to which it may be set. In this case the spring simply aids in raising the adjustable part. The friction applied must be overcome by the person moving the adjustable part.

The frictional devices which I have mentioned, while accomplishing a good result in cases where there is no great variation in the weight of the adjustable part, are not reliable in other fixtures where there is a great variation of the weight, as where numerous lamps are employed, or heavy founts or shades. Consequently there is usually applied in this class of fixtures a gripping device, brake, or lock of some character, which will prevent the movement of the adjustable part, except when such brake or lock is disengaged. These locking devices have been of various character, the most common in chandeliers being a brake or lock arranged at some point between the adjustable and stationary parts, with a connection through the central shaft as a means for operating it.

The object of my invention is to apply the engaging device to the spring-drum, so as to prevent its rotation except when adjustment is desirable.

I will first illustrate my invention as applied to chandeliers in which the spring-drum is arranged near the point of suspension, and in which the axis of the drum is horizontal, and so that the drum revolves in a vertical plane.

A represents the frame, within which the spring-drum B is hung upon an axis, C, in the usual manner. To the lower end of the spring-drum the stationary tube D of the central shaft is attached, also in the usual manner, and within which tube D the adjustable tube E, carrying the lamps, is also arranged in the usual manner. The spring-drum is provided with the usual spring, and from the drum a cord or chain, F, extends downward into the central shaft and is connected to the inner tube in the usual manner, and so as to permit the adjustable part to be drawn down or raised, also in the usual manner.

G represents the loop or hanger by which the chandelier is suspended. This hanger is hung to the top of the frame upon a vertical pivot, H, as indicated in section, Fig. 1, and so that the frame, with all it carries, may rotate upon the pivot to some extent in a horizontal plane without imparting such rotation to the hanger G.

The drum is provided with a series of teeth or notches, *a*, more or less in number, which are concentric with the axis of the drum. From the hanger a dog, I, projects downward, and so as to stand in the path of the teeth *a* on the drum when the parts are in the normal position, as represented in Figs. 1 and 2.

Between the drum and hanger a spring, J, is arranged, the tendency of which is to hold the dog and teeth of the drum in engagement, as represented in Fig. 1, but so as to yield under the rotation of the frame in a horizontal plane, and so that the teeth of the drum may be turned out of engagement with the dog, as indicated in broken lines, Fig. 3; but when the frame is left free then the spring will cause the frame to return to bring the teeth into the plane of the dog.

Figure 8:
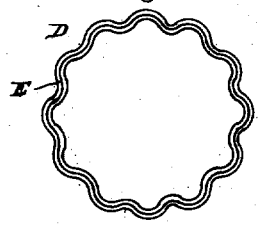

It will be understood that the engagement of the teeth of the drum with the dog is in the direction against the winding action of the spring. The backs of the teeth are inclined, so that the teeth may escape the dog as the drum rotates under the action of drawing the cord or chain therefrom. It will therefore be apparent that when the dog and drum are engaged, as represented in Figs. 1 and 2, the reaction of the spring in the drum will be prevented, but that when they are disengaged the spring will be free to apply its reactive power to raise or aid in raising the adjustable part of the chandelier. Normally the drum stands engaged with the hanger. If in this condition the adjustable part be drawn downward, the drum will revolve in the usual manner, its teeth successively escaping the dog I of the hanger; but when the drawing-down force is removed the reactive force of the spring begins and the drum will engage the hanger, as before described, and such reactive force be arrested. If, now, it be desired to raise the adjustable part, the hand is applied to the lower part or tip of the central shaft in the usual manner, and a partial rotation is imparted thereto sufficient to turn the frame out of engagement with the hanger, as represented in Fig. 3. Then the adjustable part is free to rise, as in the usual construction of this class of chandeliers; but during such rise the chandelier must be held so as to prevent its rotative return until the desired elevation is attained. Then, the chandelier left free, the spring between the hanger and frame reacts and draws the chandelier and hanger again into position for the dog to engage the drum, it being understood that the parts of the central shaft engage each other either by frictional contact or irregular shapes, as seen in Fig. 8, so that the rotation of the adjustable part will cause like rotation of the stationary part.

I have represented the engagement of the dog with the drum as being positive against the reactive force of the spring, but leaving the drum free to escape in the drawing-down operation. The engagement between the drum and the dog, however, may be positive by making the notches in the drum to present a square shoulder in both directions, as indicated in Fig. 4, instead of presenting a square shoulder on one side and an incline on the reverse side.

Figure 7:
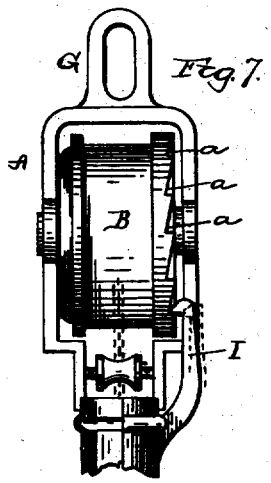

I have represented the dog as a part of the hanger by which the lamp is suspended, and which, therefore, is not rotatable, the frame carrying the drum being adapted to revolve upon a pivot between it and the hanger; but, if preferred, the hanger may be made, as in many cases, a stationary permanent part of the frame. In this case the outer tube of the central shaft, which is fixed to the frame, will be attached to the lower end of the frame, as seen in Fig. 7, and so that it may rotate thereon. The dog I in this case is formed as a part of or as a projection from the part of the shaft attached directly to the frame, and so that as the chandelier is rotated the dog will rotate with it and move toward or from the notches in the drum, as indicated in broken lines, Fig. 7.

In other constructions of chandeliers the spring-drum is arranged within the boss from which the arms project, (see Fig. 9,) and which boss moves with the adjustable portion of the fixture, K representing the boss. In this case the frame carrying the spring-drum is attached to the lower end of the adjustable portion E of the central shaft, and so that it may have a certain amount of rotation thereon, as upon a vertical axis, and, as it did in the first illustration, upon the hanger portion of the chandelier. Then from the lower end of the tube E the dog I projects into the path of the notches on the drum when the parts are in the normal condition, and as first described. In this case the two portions D E of the central shaft are of irregular shape in transverse section, as seen in Fig. 8, and so that, the upper part being stationary, the lower part will be prevented from rotation, but yet free for vertical movement. The boss and the arms it carries may rotate upon the lower end of the central shaft, and so that by a slight rotative movement, as before described, the notches in the drum will be taken out of the plane of the dog and the drum left free to revolve under the ascent or descent, as the case may be, so long as the drum is so held out of possible engagement with the dog; but to lock the drum to prevent its revolution the rotative portion of the chandelier is permitted to return to bring the ratchet into the plane of and so as to engage with the dog, as before described.

Figure 9:
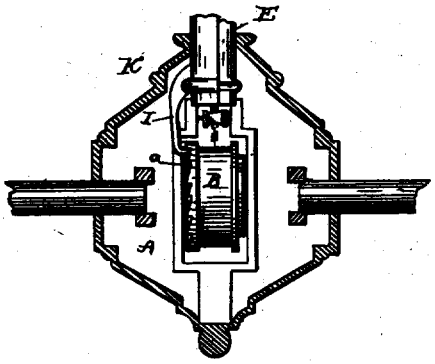
Figure 10:
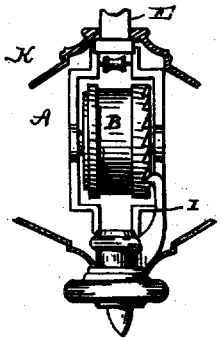

Instead of making the drum and the arm portion of the chandelier to rotate, as I have described and have illustrated in Fig. 9, they may be made in the usual manner—as a part of the tube E—or so that there shall be no movement of one independent of the other, and yet retain my invention. To do this the drum is arranged in the boss of the chandelier in the same manner as before described, and as seen in Fig. 10. In this case the tip L, which forms the lower termination of the chandelier, and which is concentric in the boss, may be arranged so as to rotate in a horizontal plane, as indicated in Fig. 9, and this tip carries the dog I in a position to engage the drum in the normal condition and so as to lock the drum, as before described. Then to disengage the drum, so as to permit the up or downward movement of the chandelier, the tip is rotated so far as to take the dog out of the path of the revolving drum. Thus the drum is free to revolve, and consequently the chandelier free to be moved up or down, and this movement may continue between the two extremes until the tip is returned to bring the dog into the path of and so as to lock the drum.

It will be understood that the returning-spring may be applied in all cases alike, so as to automatically return the part which has been rotated to bring the parts into the locking position.

In case of a horizontally-arranged spring, as seen in Figs. 5 and 6, the pivot between the frame A and hanger G is constructed so as to permit not only a rotation of one upon the other, but so as to permit the frame to be drawn downward from the hanger, as indicated in broken lines, Fig. 5. In this case the pivot extends into the hanger and is provided with a head, *b*, between which and the hanger is a spring, *d*, the tendency of which is to hold the frame up against the hanger, but permit the frame to be drawn down from the hanger, as represented in broken lines, Fig. 5.

From the hanger the dog I projects directly downward through a hole, *e*, in the frame, and so as to engage the teeth or notches *a* on the upper head of the drum when the fixture stands in its normal position.

The power of the spring *d* is considerably less than the power of the spring in the drum; hence the first effort to pull down the adjustable part of the fixture will cause the whole fixture, including the frame, to descend and move away from the hanger G, as indicated in broken lines, Fig. 5. This downward movement of the fixture independent of the hanger is only sufficient to disengage the drum from the hanger. When so disengaged, the adjustable part may then be drawn downward to any desired extent without interference between the hanger and drum; but to prevent any possible interference between the hanger and drum while adjustment is being made the downward movement of the fixture takes the frame so far down that the dog I escapes therefrom. Then the before-mentioned rotative movement is imparted to the fixture independent of the hanger, which carries the dog to one side of the hole *e* through the frame, as indicated in Fig. 6, thereby preventing the entrance of the dog into engagement with the drum until the fixture shall have been returned, and while the disengagement so exists the adjustable part of the fixture may be raised or lowered at will, and when the desired elevation is attained the fixture is returned to permit the dog again to enter into engagement with the drum, and when so engaged prevent the upward movement of the fixture, or either the upward or downward, if the engaging teeth or notches of the drum be of the character represented in Fig. 4.

I illustrate the hanger in Figs. 5 and 6 as provided with two dogs and the frame with corresponding holes.

To limit the extent of rotation of the frame with relation to the dog, the frame is provided with stops *f g*, between which the hanger stands, and so that the one stop, *f*, will arrest the rotation of the frame when it has been turned sufficiently far to insure the rest of the dog upon the frame. The other stop, *g*, is in a position to arrest rotation when the frame shall have been turned into position for the dog to engage the drum.

In the first illustrations the frame forms a stop on one side of the back and the drum on the opposite side to arrest rotation accordingly as engagement or disengagement shall have been produced, these parts operating substantially the same as the stops *f g* in Fig. 6.

To automatically bring the dog and frame into the engaging position, a spring may be applied between the two to act in the same manner as the spring J in the first illustration, and this spring may be the spring *d*, which lifts the frame into the engaging position with the hanger. The spring *d* being a helical spring, one end may be engaged with the hanger and the other with the pivot, as represented in Fig. 5, and so that the rotative movement of the fixture with relation to the hanger will produce a torsional action upon the spring, the reaction of which will, if permitted, cause the fixture to return into the engaging position.

The arrangement of the drum upon a vertical axis, and so as to revolve in a horizontal plane, as I have illustrated, is best adapted for hanging lamps, or such as are known in the trade as "library-lamps," which are supported by two or more chains, the said chains both wound on the drum over pulleys (represented in Fig. 6) upon opposite sides of the drum, so that as the lamp is raised the drum turns in the direction to wind both chains onto the drum, or when the lamp is drawn down both chains are drawn equally from the drum. This is a common arrangement and does not require particular description.

In case of lamps or fixtures suspended by chains from the spring-drum the rotative movement is imparted through the chains in substantially the same manner as I have described for the rotative movement in the chandelier.

In many extension-fixtures having an engaging device to retain the adjustable part at any point to which it may be adjusted frictional devices are employed to prevent a too rapid descent or ascent of the adjustable part. If it be desirable, such frictional devices may be in like manner provided with the engaging devices herein described; but such frictional devices constitute no part of my present invention. They being well known, it is unnecessary to illustrate or describe them.

I claim—

1. In a lamp-fixture adapted to be hung from the ceiling and consisting of two parts, one the suspending portion and the other part carrying the lamp or lamps, the said other part adjustable to different elevations with relation to the suspending portion, the combination therewith of a frame, a spring-drum arranged upon an axis in said frame, the said frame and drum arranged in one of said parts, a cord or chain upon said drum and extending therefrom into connection with the other of said parts, the said drum constructed with one or more notches in a line concentric with the axis of the drum, and a dog adapted to engage the notches in the drum when the parts are in the normal position, the said frame and dog, the one constructed for limited rotation in a horizontal plane and the other stationary with relation to the same plane, substantially as described.

2. In a lamp-fixture adapted to be hung from the ceiling and consisting of two parts, one of said parts adapted to be suspended from the ceiling and remain stationary, the other part adapted to carry the lamp or lamps and adjustable to different elevations, the combination therewith of a spring-drum hung in a frame formed as a part of the stationary portion, a cord or chain therefrom in connection with the adjustable part, a hanger above the said frame and to which the said frame is pivoted, so that the said frame may rotate on the said pivot, the said drum constructed with one or more notches, and the hanger constructed with a corresponding dog adapted to engage said notch or notches of the drum in the normal condition of the fixture, substantially as described, and whereby said engagement of said hanger and drum may be released by a rotative movement of the fixture, substantially as described.

3. In an extension lamp-fixture, the combination of a frame carrying the stationary part of the fixture, a drum arranged upon an axis in said frame, a cord or chain therefrom and connected to the adjustable part of the fixture, a hanger to which the said frame is connected by a pivot, so as to permit a partial rotation of the said frame and drum, the said drum constructed with one or more notches in a line concentric with the axis of the drum, the hanger constructed with a dog extending downward and so as to stand in the path of said notch or notches on the drum in the normal condition of the drum, and a spring between said hanger and frame, the tendency of which is to draw the said hanger and drum into engagement, but yield under the rotative movement of the frame, and so as to take the drum out of engagement with the hanger, substantially as described.

4. In an extension lamp-fixture, the combination of a frame, A, carrying the stationary part of the fixture, a drum, B, hung in the said frame upon a horizontal axis and so as to revolve in a vertical plane, a cord or chain extending from said drum into connection with the adjustable part of the fixture, the said drum constructed with a series of notches or teeth, *a*, concentric with its axis, a hanger, G, with a vertical pivot-connection between said hanger and frame, whereby a horizontal rotation is permitted to the frame and all it carries independent of the hanger, a dog, I, projecting downward from said hanger into the path of the said concentric series of notches on the drum, and a spring, J, connected by one end to the frame and by the other end to said hanger, the tendency of the spring being to yieldingly hold the frame in the position of engagement between the dog and drum, but so as to permit disengagement under a rotative movement of the said frame, substantially as described.

5. In a suspension lamp-fixture, the combination of a suspending stationary part, an adjustable lamp-carrying part, a frame attached to one of said parts, a spring-drum mounted on an axis in said frame, cords or chains upon said drum connected with the lamp-carrying part, said drum and stationary part being provided with a locking device, which consists of a dog formed upon the stationary part adapted to come in contact with the drum when the frame bearing the drum is rotated, said frame being capable of limited rotation in a horizontal plane, substantially as shown and described.

6. In a suspension lamp-fixture, the combination of a suspending stationary part, an adjustable lamp-carrying part, a frame attached to one of said parts, a spring-drum mounted on an axis in said frame, cords or chains upon said drum connected with the lamp-carrying part, said drum and stationary part being provided with a locking device, a portion of which is formed upon the drum and a portion upon the stationary part, said separate portions being brought in contact and separated by the rotation of the frame, said frame being capable of limited rotation, substantially as shown and described, and for the purposes set forth.

7. In a suspension lamp-fixture, the combination of a suspending stationary part, an adjustable lamp carrying part, a frame attached to one of said parts, a spring-drum mounted on an axis in said frame, cords or chains upon said drum connected with the lamp-carrying part, said drum and stationary part being provided with a locking device, which consists of a dog formed upon the stationary part, and a stop or stops formed upon the drum, said dog and stop or stops being adapted to interlock when the frame is rotated, said frame being capable of limited rotation in a horizontal plane, substantially as shown and described.

8. In a suspension lamp-fixture, the combination of a suspending stationary part, an adjustable lamp-carrying part, a frame attached to one of said parts, a spring-drum mounted on an axis in said frame, cords or chains upon said drum and extending to and connected with the lamp-carrying part, said drum and stationary part being provided with a locking device consisting of two portions, one of which is formed upon the drum and the other upon the stationary part, the frame carrying the drum being capable of limited rotation in a horizontal plane, and that portion of the lock formed upon the stationary part being stationary with reference to said plane, the separate parts of the lock being brought together and the lamp-carrying part locked at any desired altitude by the rotation of the frame.

9. In a suspension-fixture, the combination of a stationary suspending part, an adjustable part, a spring-drum mounted in a frame attached to one of said parts, and a locking device, a portion of which is connected with one of said parts and a portion with a spring-drum, the locking device being operated and the position of the suspended body adjusted by rotating the support thereof.

10. In a suspension lamp-fixture, the combination of a stationary suspending part, an adjustable part, a lamp-carrying part, a spring-drum mounted on a frame attached to one of said parts, and a locking device, a portion of which is connected with one of said parts and a portion with the spring-drum, the locking device being operated and the position of the lamp adjusted by rotating the lamp-support.

FRANK RHIND.

Witnesses:
WILLIAM P. EGAN,
SADIE SMITH.